Feb. 23, 1960  W. J. EATON ET AL  2,925,969
AUXILIARY UNDERCARRIAGE

Filed Sept. 21, 1956   2 Sheets-Sheet 2

INVENTORS
WILLIAM J. EATON
FRANK C. MINCH
BY
ATTORNEYS

United States Patent Office 2,925,969
Patented Feb. 23, 1960

2,925,969
AUXILIARY UNDERCARRIAGE

William J. Eaton, South Bend, Ind., and Frank C. Minch, Dayton, Ohio, assignors to the United States of America as represented by the Secretary of the Air Force Application September 21, 1956, Serial No. 611,397

1 Claim. (Cl. 244—103)

This invention relates to an auxiliary undercarriage primarily for use on aircraft and, more particularly, to an auxiliary undercarriage that is employed on an aircraft during its take-off but is released thereafter by the pilot of the aircraft.

Aircraft, which carry heavy loads of fuel to be normally consumed in flight or relatively heavy cargo that is delivered overboard during flight such as bombs, for example, have a substantially greater gross take-off weight than their gross landing weight. Accordingly, it will be obvious that the load an undercarriage is required to support during take-off is substantially larger than the load the undercarriage supports during landing. The use of an auxiliary landing gear for take-off is shown in Patent Number 2,637,512 issued to Franklin C. Albright, on May 5, 1953.

The present invention is an improvement of auxiliary landing gear since the auxiliary undercarriage of the present invention is released by the pilot of the aircraft rather than automatically upon the aircraft becoming airborne as in the Albright patent. The auxiliary wheel of the prior devices might crash into some part of the plane's undercarriage or fuselage after release from the aircraft whereas in the present invention this danger is eliminated since the auxiliary landing gear is released by the pilot rather than automatically on the plane leaving engagement with the ground.

An object of the present invention is to provide an auxiliary landing gear for an aircraft that is released by the pilot after the aircraft is airborne.

Other objects of this invention will be readily perceived from the following description.

This invention relates to an undercarriage for use on an aircraft. The undercarriage comprises a main axle adapted to be secured to the aircraft and an auxiliary axle connected to the main axle. Remotely actuated means release the auxiliary axle from the main axle when desired.

Figure 1:
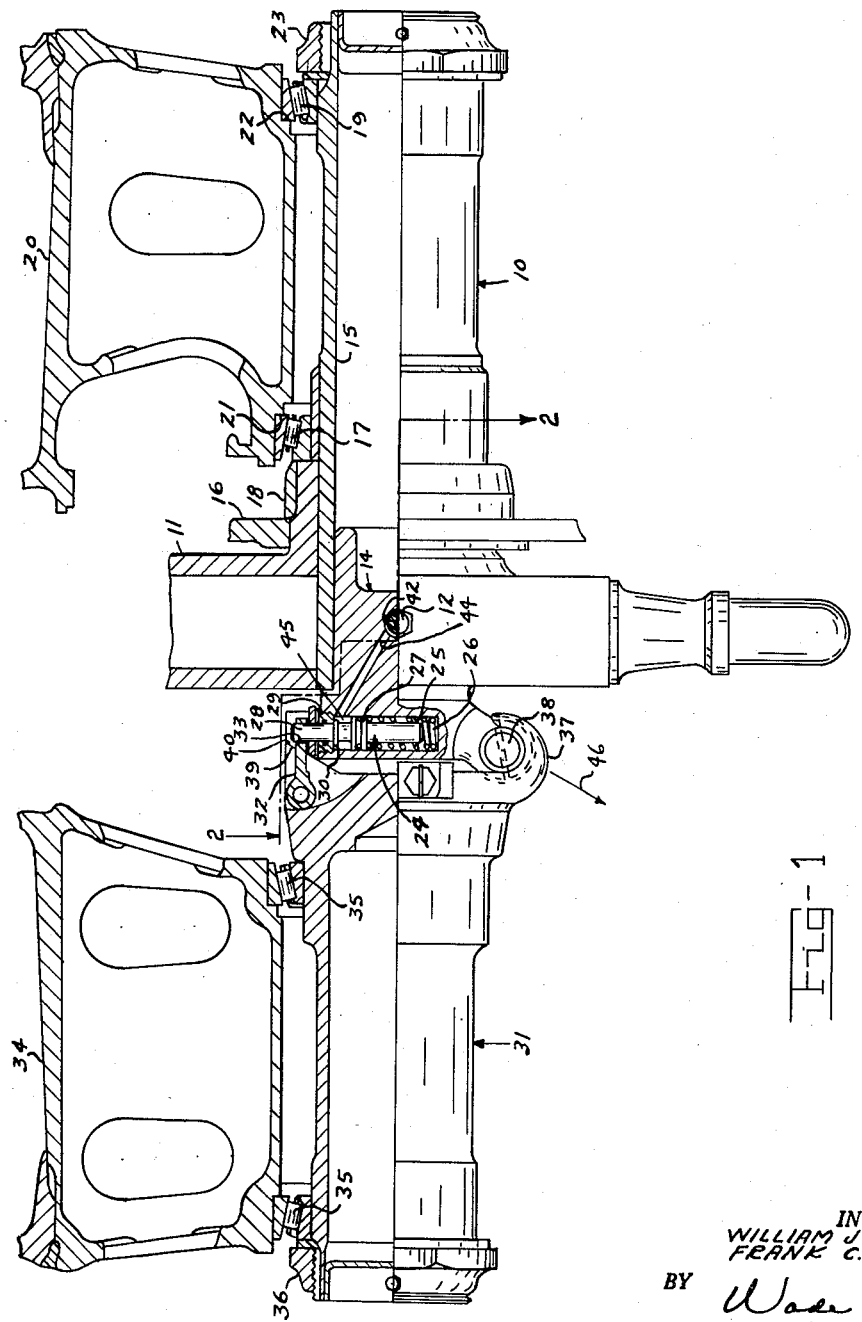
Figure 2:
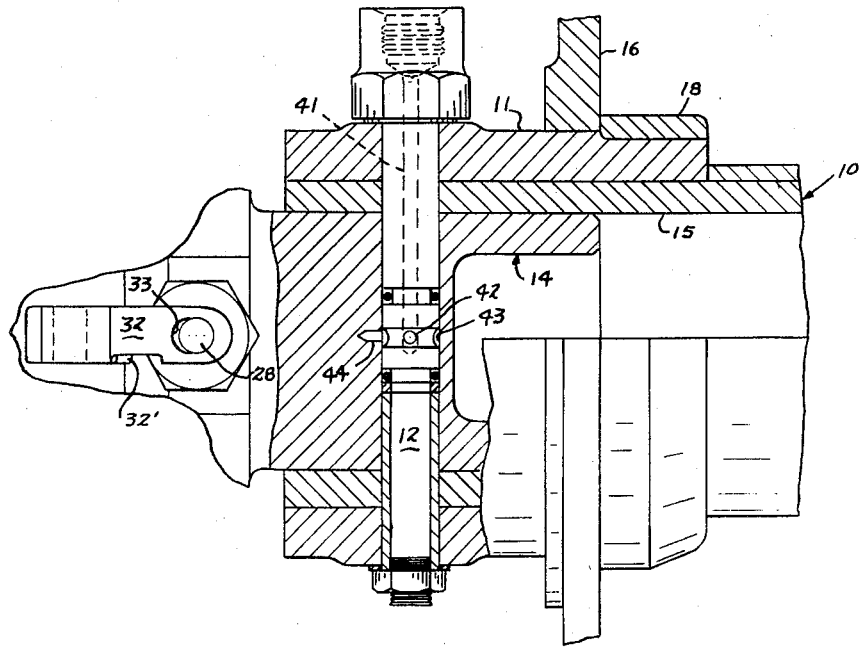
Figure 3:
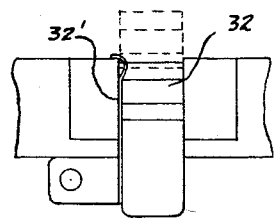

The attached drawing illustrates a preferred embodiment of the invention, in which Fig. 1 is an axial sectional view, partly in elevation, of the present invention; and Fig. 2 is a top plan view, partly in section, of a portion of the apparatus of Fig. 1; and Fig. 3 is an end elevational view of a portion of the auxiliary axle of the present invention.

Referring to the drawing, there is shown a main axle 10 adapted to be permanently attached to a landing gear element such as a strut 11. A bolt 12 connects the main axle 10 to the strut 11 (see Fig. 2). An adapter 14, which is disposed within bore 15 of the main axle 10, is secured to the main axle 10 and the strut 11 by the bolt 12.

A mounting flange 16 is secured to the strut 11 to position an antifriction bearing 17 through a spacer ring 18. The bearing 17 cooperates with another antifriction bearing 19, which is axially spaced from the bearing 17, to rotatably support a wheel 20 on the main axle 10. The wheel has shoulders 21 and 22 that engage portions of the bearings 17 and 19, respectively, whereby pressure on the bearing 19 by a hub nut 23 threaded on the end of the axle 10 results in the wheel and bearings being retained in their assembled position on the axle 10.

The adapter 14 has a latch mechanism including a movable piston member 24 disposed in a recess 25. Resilient means such as a spring 26 is disposed within the confines of the recess 25 and acts against a portion 27 of the movable member 24 to urge a portion 28 out of the recess 25. The outward movement of the movable member 24 is limited by a shoulder 30 engaging a nut 29 threaded into the walls of the recess.

An auxiliary axle 31 is connected to the main axle 10 through the adapter 14. The auxiliary axle 31 is held in its connected relation with the main axle 10 by a catch member 32 pivotally secured to the auxiliary axle. The catch member 32 has an opening 33 therein through which the portion 28 of the movable member 24 extends when it is biased upwardly by the spring 26. The opening or slot 33 is slightly larger than the portion 28 of the movable member 24 so that heavy loads are not transferred through the movable member 24 when it projects into the opening 33 but rather through the axles 10 and 31.

As is more clearly shown in Fig. 3, the catch member 32 is engaged by a detent spring 32' to bias the catch member 32 upwardly (dotted line position of Fig. 3) to permit easy insertion of the portion 28 of the member 24 through the opening 33. The catch member 32 is moved downwardly after insertion of the portion 28 in the opening 33; the detent spring 32' then acts downwardly against the upper surface of the catch member 32 (solid line position of Fig. 3) to prevent unlatching of the member 32 from the portion 28 due to ground vibration, for example.

An auxiliary wheel 34 is rotatably supported on the auxiliary axle 31 by the axially spaced antifriction bearings 35. A hub nut 36 maintains the wheel and bearings in the assembled position on the axle 31 by being threaded on the end of the axle 31.

The auxiliary wheel 34 supports the aircraft through a pair of hooks 37 (one shown), which is formed integral with the auxiliary axle 31, bearing against a crosspin 38 on the adapter 14. The tendency of the auxiliary wheel 34 to rotate about the cross pin 38 in a clockwise direction is resisted by an inclined surface 39 on the auxiliary axle 31 engaging a parallel inclined surface 40 on the adapter 14. These engaging surfaces 39 and 40 are inclined so that the turning movement of the wheel 34 is resisted by a normal load on these surfaces.

The bolt 12, which connects the main axle 10 and the adapter 14 to the strut 11, has a passage 41 extending through the center thereof for a substantial distance. A second passage 42 in the bolt 12 provides communication between the passage 41 and a passage 43 in the adapter 14 in which the bolt 12 is disposed. The adapter 14 has an inclined passage 44 communicating with the passage 43 at one end. The other end of the passage 44 connects with a chamber 45, which is formed in the recess 25 between the movable member 24 and the stop nut 29. Thus, it will be readily observed that if fluid under pressure is supplied to the passage 41 that the fluid flows through the passages 42, 43 and 44 into the chamber 45 to exert a force on the movable member 24 to overcome the force of the spring 26 and move the portion 28 of the movable member 24 out of the opening 33 in the catch member 32, which releases the auxiliary axle 31 from its connection with the main axle 10; this fluid is supplied to the chamber 45 whenever desired by the pilot of the aircraft after the aircraft leaves the ground. Preferably the same fluid is employed that retracts the permanent landing gear including the strut 11. If desired, a priority valve may be employed in the hydraulic system so that fluid is supplied to the chamber 45 to jettison the auxiliary axle and wheel prior to retraction of the permanent landing gear.

After the aircraft is airborne and before the auxiliary wheel and axle are released by the actuation of the hydraulic system, the support for the auxiliary axle and wheel is provided by the movable member 24 and the hooks 37. The auxiliary axle 31 remains attached to the main axle 10 because it can move only in the direction indicated by the arrow 46, which is parallel to the angle of inclination of the engaging surfaces 39 and 40; this movement is resisted by engagement of the movable member 24 with the catch member 32. When the aircraft has left the ground, the weight of the auxiliary axle and wheel tends to tilt the wheel in a counterclockwise direction as seen in Fig. 1; this tilting is prevented by the crosspin 38 acting against the hooks 37 and the member 32 engaging the portion 28.

Considering the operation of the present invention, the auxiliary axle 31 is secured to the main axle 10 through the adapter 14. The portion 28 of the movable member 24 extends into the opening 33 of the pivoted catch member 32 of the auxiliary axle 31 to hold the auxiliary axle in a connected relation with the main axle 10. When the auxiliary wheel 34 is supporting the aircraft through the hooks 37 bearing against the crosspin 38, the auxiliary axle and wheel tend to pivot about the crosspin 38 in a clockwise direction as seen in Fig. 1. The engaging surfaces 39 and 40 prevent this rotation and are so inclined that the pivotal movement is resisted by a normal load on these surfaces. After the aircraft becomes airborne, the axle and wheel tend to pivot or swing in a counterclockwise direction as seen in Fig. 1 but the crosspin 38 acts against the hooks 37 together with the interlatch of member 32 and portion 28 to prevent this. It will be noted that the engagement of the portion 28 of the movable member 24 in the slot 33 of the catch member 32 supports the auxiliary axle 31 and its wheel 34. The engagement of the hooks 37 with the crosspin 38 also aids in supporting the auxiliary axle and wheel when the aircraft is airborne.

After the aircraft has become airborne and the pilot ascertains that it will not be necessary to land immediately, the pilot releases the auxiliary axle and wheel from the main axle. This is accomplished by supplying fluid from the hydraulic system through the passages 41 and 42 in the bolt 12 and passages 43 and 44 in the adapter 14 to the chamber 45. The pressure of the fluid acts against the movable member 24 to overcome the force of the spring 26 and withdraw the portion 28 of the movable member 24 out of the opening 33 in the catch member 32. As the portion 28 moves out of the opening 33, the weight of the auxiliary axle and wheel moves them away from the main axle 10 and the adapter 14. The downward movement of the auxiliary axle and wheel is along a plane indicated by the arrow 46, which is parallel to the inclined engaging surfaces 39 and 40 on the axle 31 and the adapter 14, respectively.

The pilot may release the auxiliary axle and wheel at any time after the aircraft becomes airborne; it is desirable that such not be done until the aircraft is at sufficient height to avoid any possibility of the auxiliary wheel striking the fuselage or permanent landing gear of the craft. Likewise, it is preferable to jettison the auxiliary axle and wheel prior to retraction of the permanent landing gear; employment of the priority valve in the hydraulic system insures that the auxiliary undercarriage is released before retraction of the permanent landing gear.

An advantage of this invention is that it increases the performance characteristics of the aircraft by reducing its weight immediately after take-off. The present invention also has the advantage of insuring that the auxiliary wheels remain attached until the aircraft is safely in the air since the pilot controls when the wheels are released. The use of the auxiliary undercarriage permits the aircraft to operate from more hastily prepared runways. Another advantage of this invention is that it reduces the cavity surface in the wings or fuselage or both that would normally be occupied by such gear if it were permanently attached; this permits more fuel space in the plane, for example, to thereby increase its operating range. The present invention has the advantage of eliminating any possibility of the wheels hitting the undercarriage or fuselage of the aircraft since the pilot releases the wheels with sufficient clearance above the ground.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

We claim:

An undercarriage for use on aircraft comprising a main axle adapted to be secured to an aircraft, an auxiliary axle, an adapter secured to the main axle, the adapter including a movable member, a member pivotally secured to the auxiliary axle having an opening therein, resilient means urging the movable member into the opening of the member pivotally secured to the auxiliary axle to connect the auxiliary axle to the main axle, additional cooperating means including a pin on the adapter and a pair of hooks on the auxiliary axle to aid in the support of the auxiliary axle, and means to overcome the resilient urging means to move the movable member out of the opening in the member pivotally secured to the auxiliary axle to release auxiliary axle from the main axle.

References Cited in the file of this patent

UNITED STATES PATENTS

| | | |
|---|---|---|
| 1,128,573 | Beck et al. | Feb. 16, 1915 |
| 2,637,512 | Albright | May 5, 1953 |

FOREIGN PATENTS

| | | |
|---|---|---|
| 317,774 | Great Britain | Aug. 21, 1929 |
| 695,892 | Great Britain | Aug. 19, 1953 |